Nov. 30, 1965 R. B. KINZBACH 3,220,478
CASTING CUTTER AND MILLING TOOL
Filed Sept. 8, 1960 4 Sheets-Sheet 1
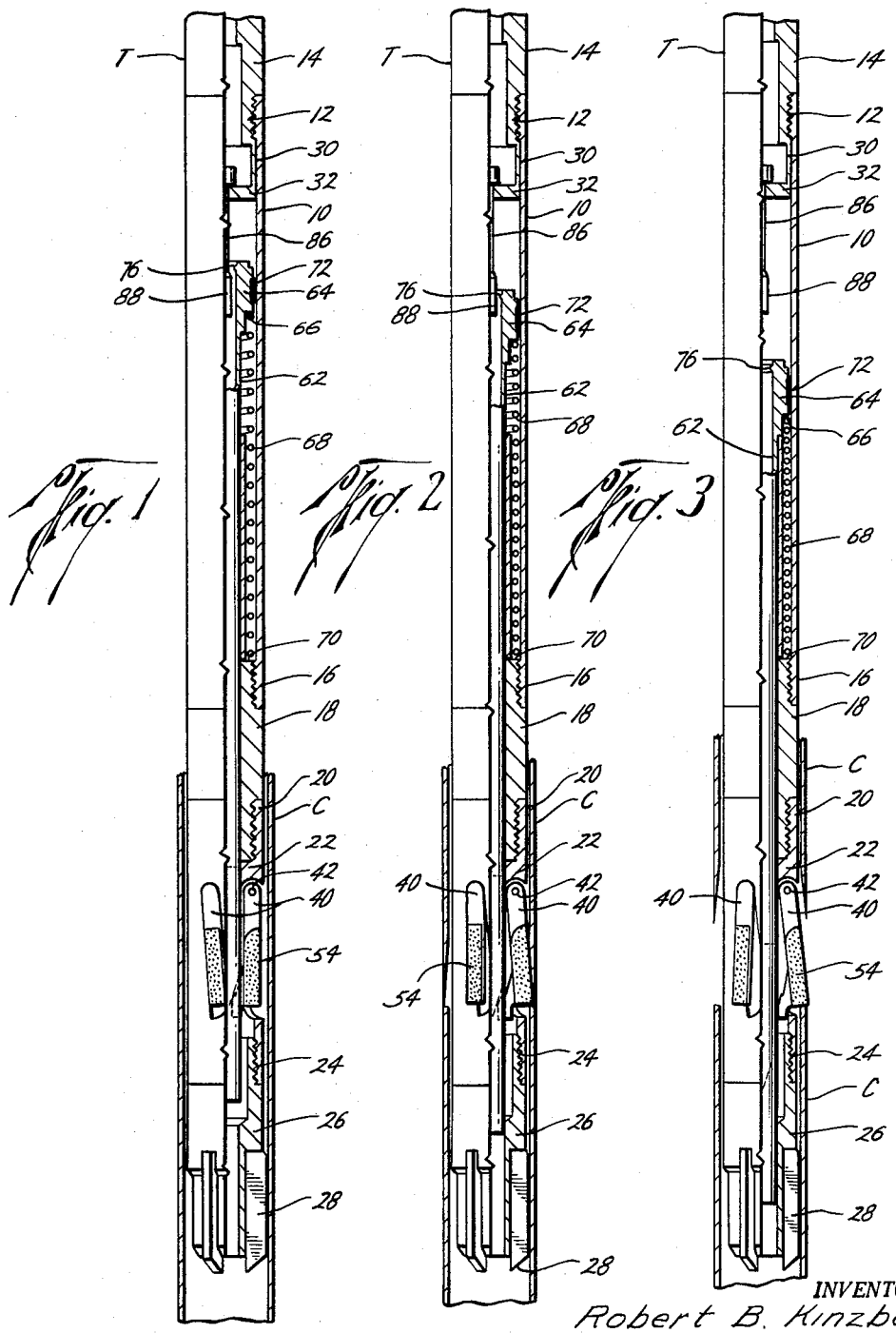
INVENTOR.
Robert B. Kinzbach
BY
Charles E. Lightfoot
ATTORNEY

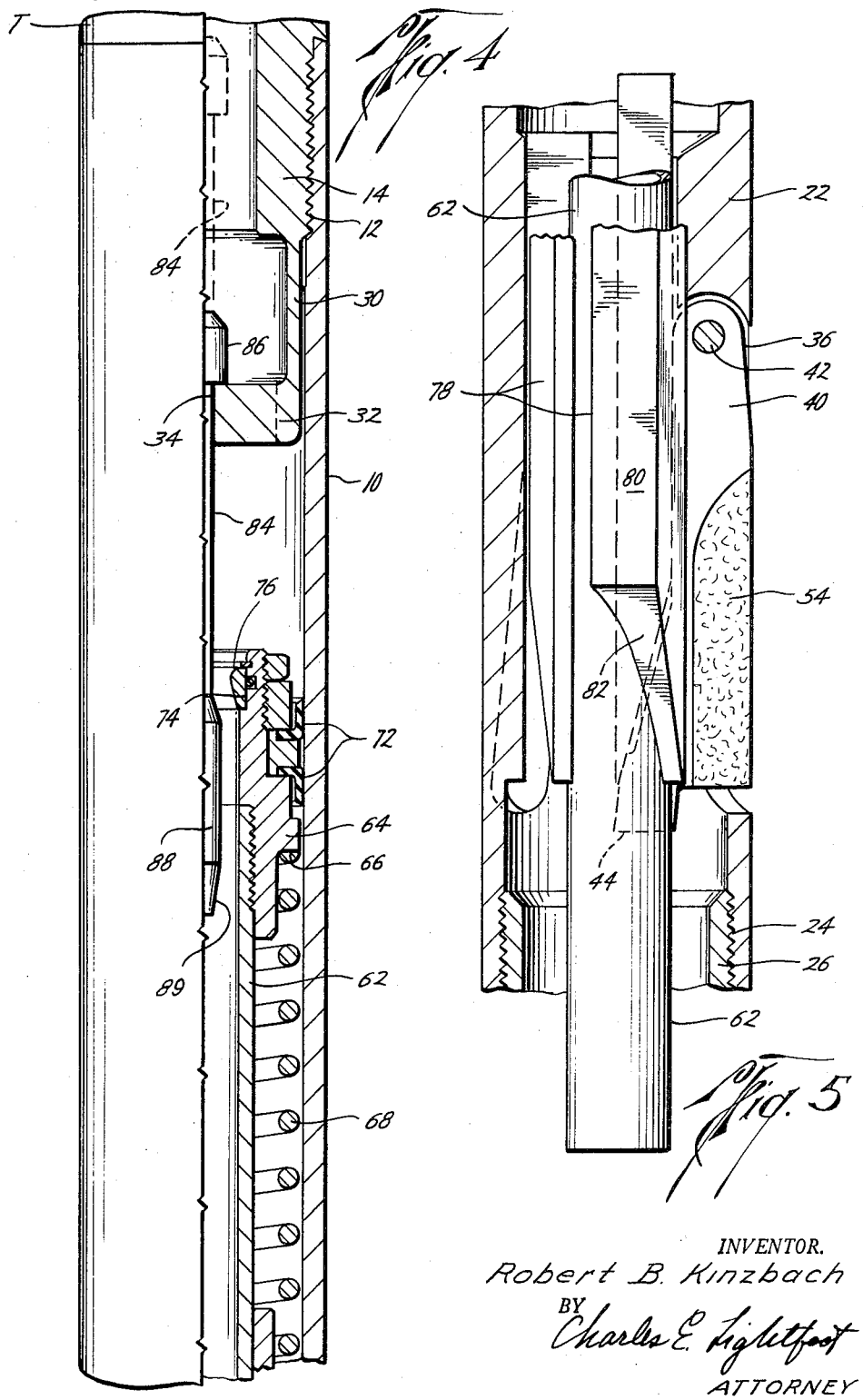

Nov. 30, 1965  R. B. KINZBACH  3,220,478
CASTING CUTTER AND MILLING TOOL
Filed Sept. 8, 1960  4 Sheets-Sheet 3
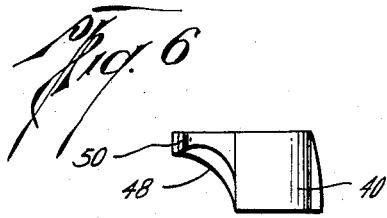
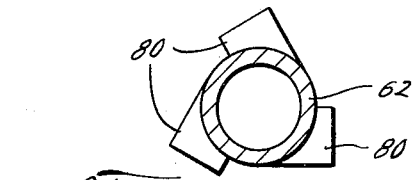
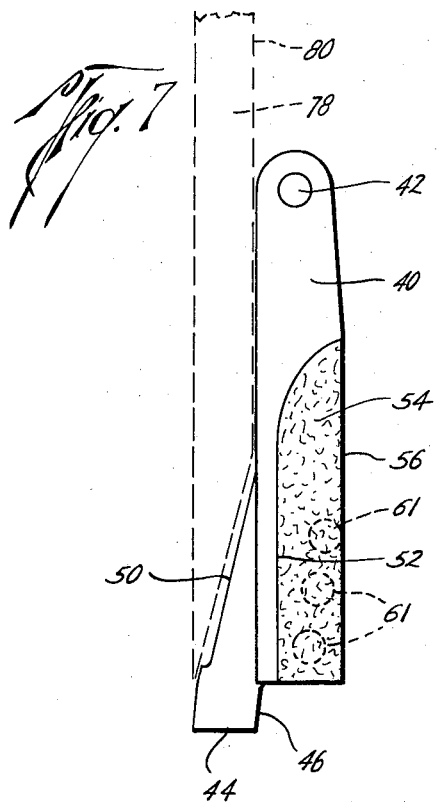
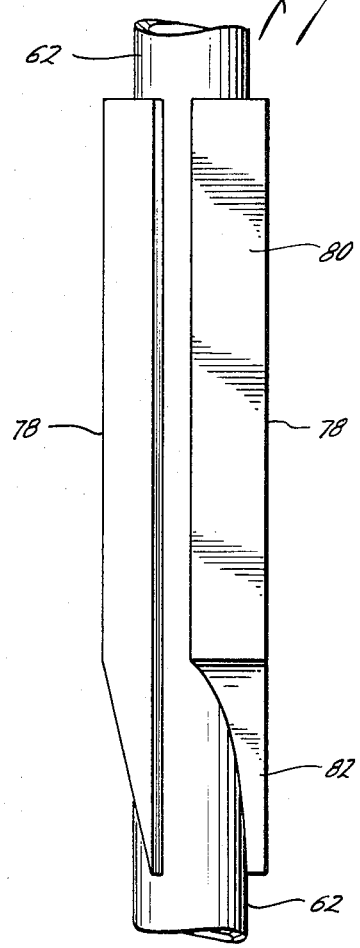
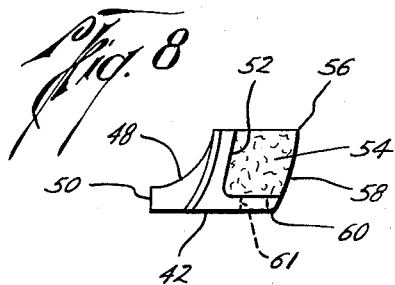
INVENTOR.
Robert B. Kinzbach
BY Charles E. Lightfoot
ATTORNEY Nov. 30, 1965    R. B. KINZBACH    3,220,478
CASTING CUTTER AND MILLING TOOL
Filed Sept. 8, 1960    4 Sheets-Sheet 4
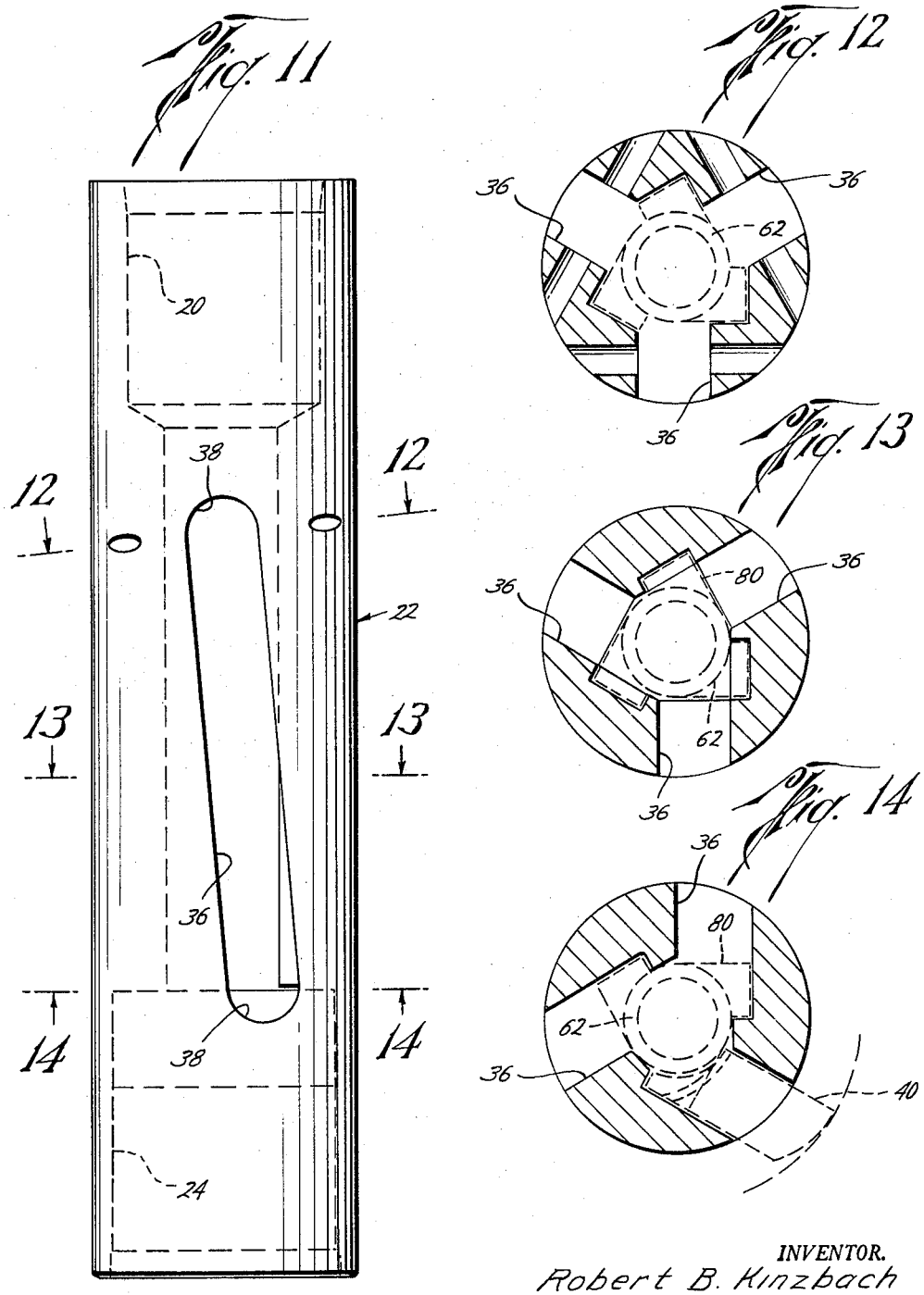
INVENTOR.
Robert B. Kinzbach
BY Charles E. Lightfoot
ATTORNEY United States Patent Office 3,220,478
Patented Nov. 30, 1965

3,220,478
CASING CUTTER AND MILLING TOOL
Robert B. Kinzbach, 6203 Valley Forge, Houston, Tex.
Filed Sept. 8, 1960, Ser. No. 54,807
7 Claims. (Cl. 166—55.8)

This invention relates to a casing cutter and milling tool and more particularly to a tool for use in wells and having extensible cutter elements and means operable by fluid pressure from the ground level for extending the same.

In the production of wells, such as oil and gas wells, provided with well casings, it is often desirable to cut through the casing at some particular depth and also to mill away a portion of the casing to increase the length of the opening therethrough.

The present invention has for an important object the provision of a casing cutting and milling tool which is adapted to be connected to a tubular operating string for lowering into a well and for rotation therein by rotation of the string, and which is constructed to be placed in condition to cut the surrounding well casing by fluid pressure acting through the string.

Another object of the invention is to provide a casing cutter and milling tool having extensible cutters and means for extending the same which is actuated by the pressure of fluid in a tubular operating string, and including means for restricting the flow of fluid through the string to cause an increase in the pressure exerted on the cutter actuating mechanism to move the cutters to cutting position, and means for opening the string when the cutters are in cutting position to permit substantially unrestricted flow of fluid through the string to promote the removal of cuttings during the cutting operation.

A further objecting of the invention is the provision of a casing cutting and milling tool having a cutter body and cutting elements movably mounted thereon for radial movement into cutting engagement with a surrounding well casing and in which improved bearing contact is obtained between the body and the elements when the elements are in cutting position to enable the tool to better withstand the forces exerted on the elements during the cutting operation.

Another object of the invention is to provide a casing cutting and milling tool comprising a tubular cutter body or barrel adapted to be connected into a tubular operating string, cutter elements movably mounted on the body for movement into and out of position in cutting engagement with a surrounding well casing, a tubular mandrel movable longitudinally in the body and shaped for engagement with the elements upon longitudinal movement of the mandrel in one direction to move the elements to cutting position, and means for restricting the flow of fluid through the mandrel to cause an increase in the force exerted on the mandrel to move the mandrel in said one direction.

A further object of the invention is the provision of a casing cutting and milling tool having a tubular cutter body or barrel adapted to be connected into a tubular operating string, a tubular mandrel movable longitudinally in the barrel and shaped to permit substantially unrestricted flow of fluid through the string, cutter elements movably mounted on the barrel for movement into and out of position in cutting engagement with a surrounding well casing and shaped for engagement with the mandrel to move the elements to said position upon longitudinal movement of the mandrel in one direction, means for restricting the flow of fluid through the mandrel to cause an increase in the force exerted on the mandrel to move the mandrel in said one direction and means for reestablishing substantially unrestricted flow through the mandrel when the mandrel reaches a predetermined position in its longitudinal movement in said one direction.

Another object of the invention is to provide in a casing cutting and milling tool of the character referred to of means for allowing the unrestricted inflow of fluid into the operating string during lowering of the string into the well prior to the cutting operation and the rapid draining of fluid from the string during removal of the string after the completion of the cutting operation.

A further object of the invention is the provision in a casing cutting and milling tool of the type mentioned of means for indicating when the cutting elements have reached their fully extended positions.

Another object of the invention is to provide a cutting and milling tool of the character referred to including means for varying the amount of restriction of the flow of fluid through the tool in accordance with the position of the cutter elements to cause a reduction in such flow to increase the cutting pressure exerted by the elements during the time that the casing is being cut through and thereafter to cause an increase in such flow to secure greater removal of the cuttings during the milling away of a portion of the casing.

A further object of the invention is the provision in a cutting and milling tool of the kind mentioned of an arrangement of parts by which limited reciprocation of the mandrel may take place in response to variations or surges in pump pressure without affecting the position of the cutter elements when the cutter elements are fully extended.

The above and other important objects and advantages of the invention may best be understood from the following detailed description of a preferred embodiment of the same, reference being had to the annexed drawings, wherein—

FIGURE 1 is a side elevational view, partly in cross-section, and on a reduced scale, illustrating a preferred embodiment of the cutting and milling tool of the invention and showing the relative positions of the parts during the insertion of the tool in a well casing with the cutting elements retracted;

FIGURE 2 is a view similar to that of FIGURE 1, showing the tool at the commencement of the cutting operation with the cutting elements partly extended and in cutting engagement with the surrounding well casing;

FIGURE 3 is a view similar to that of FIGURE 1 showing the tool with the cutting elements in fully extended position after the completion of the casing cutting operation, the elements being in position to perform a milling operation on the casing;

FIGURE 4 is a fragmentary, side elevational view, partly in cross-section, showing details of structure of the upper end portion of the tool and the manner in which the tool is placed in condition to be actuated by the pressure of fluid to expand the cutter elements into cutting engagement with the casing;

FIGURE 5 is a fragmentary side elevational view, partly in cross-section, showing structural details of the lower end portion of the tool, the cutter elements being in their inactive position;

FIGURE 6 is a top end view, on one of the cutting elements of the invention;

FIGURE 7 is a side elevational view of the cutting element illustrated in FIGURE 6;

FIGURE 8 is a bottom end view of the cutting element illustrated in FIGURE 7;

FIGURE 9 is a top end view, partly in cross-section of the cutter actuating mandrel of the invention;

FIGURE 10 is a side elevational view of the cutter actuating mandrel of FIGURE 9;

FIGURE 11 is a side elevational view, of the cutter body of the invention with the cutting elements removed therefrom;

FIGURE 12 is a cross-sectional view, taken along the line 12—12 of FIGURE 11, looking in the direction indicated by the arrows;

FIGURE 13 is a cross-sectional view, taken along the line 13—13 of FIGURE 11, looking in the direction indicated by the arrows; and FIGURE 14 is a cross-sectional view, taken along the line 14—14 of FIGURE 11, looking in the direction indicated by the arrows.

Referring now to the drawings in greater detail, the invention is illustrated herein in connection with its use in the cutting or milling of a casing C, or the like, located in a well, the cutting and milling tool being connected to a lower end sub or connector element T attached to the lower end of a tubular operating string, whereby the tool may be lowered into the casing to cut the casing at a desired depth, by rotation of the operating string.

The cutting and milling tool of the invention includes an outer tubular barrel, having an upper section 10, which is internally threaded at its opposite ends for connection to the externally threaded lower end 12 of the lower end sub 14 of the operating string, and whose lower internally threaded end 16 is connected to a tubular connector member 18, which in turn is threadably connected to the upper internally threaded end 20 of a tubular cutter body 22. The cutter body 22 is internally threaded at its lower end, as shown at 24, for the connection thereto of a tubular guiding and reaming body 26 which carries external, inserted, removable reamer blades 28, positioned for engagement with the casing to limit lateral movement of the tool in the casing and to ream away obstructions which might be encountered while running the tool in the well.

The lower end sub 14 carries at its lower end a downward extension 30, extending inside of the upper end of the upper section 10, and which is formed at its lower end with a diametrically disposed portion, or bridge, 32 past which fluid may flow through the barrel and which is provided with a central opening 34.

The cutter body 22 is provided with peripherally spaced, elongated lateral window openings 36 leading from the interior of the body to the exterior thereof and which extend longitudinally at a slight angle to the longitudinal axis of the body, and are formed with rounded ends 38.

Within each of the window openings 36 a cutter element 40 is pivotally connected to the cutter body 22 at its upper end, as by means of a pin 42, for swinging movement to a retracted position in the body within the confines of the external periphery of the body and to an extended position with the lower end of the cutter element extending radially outwardly from the periphery of the body for cutting engagement with a surrounding well casing, or to position the lower end of the cutter element for endwise cutting engagement with the casing or other object to perform a milling operation thereon upon rotation of the tool.

Each of the cutter elements 40 is formed with a radially inwardly extending projection 44, whose lower end extends downwardly beyond the main body portion of the element, as shown at 46 in FIGURE 7, in position for engagement with the inner surface of the cutter body 22 to limit outward swinging movement of the cutter element. The projection 44 has an inner curved face 48, which terminates inwardly in a longitudinally tapering inner surface 50. Each of the cutter elements is also formed with an external groove or recess 52 of angular shape in cross-section, in which a body 54 made up of particles of a hardened cutting material, such as tungsten carbide, to form a hard cutting edge 56, is positioned for engagement with the surrounding well casing to cut the same upon rotation of the tool. The body 54 has a curved outer face 58, which curves away from the cutting edge 56, to provide clearance between the inner surface of the casing and the cutter during the cutting operation, and because of the angular shape of the recess 52, the body will be backed up by the portion 60 of the cutter element during rotation of the tool. Because of this construction of the cutter elements with the curved clearance face 58 and the back-up portion or shoulder 60, the body 54 will be worn away during the cutting operation without damage to the body of the cutter element.

The outer faces 58 of the cutter elements are preferably curved on a radius to shape the elements so that the faces 58 form a substantially continuous peripheral surface with the external surface of the cutter body when the elements are in their retracted positions. The backing portions 60 of the cutter elements are also formed with longitudinally spaced openings 61, shown in FIGURES 7 and 8, which are positioned to be in vertical alignment with the end edge of the pipe to be milled away when the pipe has been cut through, and which are filled with the hardened cutting material of the body 54, whereby any swaging action by the metal of the backing in contact with the casing during the milling operation, tending to expand or flare the casing, as the body 54 is worn away, will be prevented, and cutter wear will take place along a line centrally through the openings.

Within the barrel a tubular mandrel 62 is positioned for longitudinal movement, which mandrel carries at its upper end the head 64, formed with a downwardly facing external annular shoulder 66 positioned for engagement with the upper end of a coil spring 68, as best seen in FIGURE 4, the lower end of the spring being seated on the upper end of the connector 18, which forms an internal annular shoulder 70. The coil spring 68 thus coacts with the shoulders 66 and 70 to urge the mandrel upwardly in the barrel. The head 64 is provided with suitable external seal-forming means, such as that shown at 72, in FIGURE 4, positioned for sealing contact with the internal surface of the barrel, and the head may have at its upper end an internal counterbore 74, best seen at FIGURE 4, within which an annular flow restricting ring 76 is disposed.

The mandrel 62 is provided with external radially extending lugs 78, formed with external faces 80, positioned for engagement with the inner surface of the projection 44 of the cutter elements, and which are cut away at their lower end portions to form tapering wedge faces 82, positioned for engagement with the tapered inner surfaces 50 of the projections to wedge the cutter elements radially outwardly to their extended positions. The tapered inner surfaces 50 of the cutter elements may be slightly relieved inwardly, as best seen in FIGURE 7, to provide limited contact only with the wedge portions 82 of the lugs 78, during the movement of the mandrel relative to the cutter elements. It will be apparent that when the mandrel is in its downmost position in the barrel, the projections 44 of the cutter elements will be in engagement with the outer faces 80 of the lugs 78 of the mandrel to securely hold the cutter elements in their fully extended positions, as illustrated in FIGURE 3. An elongated flow restricting element 84 is carried on the bridge 32 in downwardly depending relation thereto as by means of a head 86 attached to the upper end of the element, which rests on the bridge in surrounding relation to the opening 34 therethrough. The lower end portion of the element 84 extends into the head 64 of the mandrel in radially inwardly spaced relation to the ring 76 therein and is formed with an externally enlarged portion 88, positioned to enter the ring 76 when the mandrel reaches a predetermined position in its downward movement in the barrel, to restrict the downward flow of fluid through the mandrel to cause an increase in the downward pressure exerted on the mandrel by fluid flowing downwardly through the barrel. Thus, when the mandrel is in the position illustrated in FIGURE 1, the downward flow of fluid through the mandrel will be partially restricted to cause the exertion of a limited downward force upon the mandrel, which will be overcome by the upward pressure of the spring 68 to hold the mandrel against downward movement in the barrel, but upon an increase in the pressure of the circulating fluid, the mandrel will be moved downwardly in the barrel against the pressure of the spring 68 until the ring 76 is opposite the external enlargement 88, whereupon the downward flow of fluid through the mandrel will be greatly restricted, to cause an increase in the downward pressure exerted on the mandrel to move the mandrel further downwardly to extend the cutters outwardly into cutting engagement with the surrounding well casing. The flow restricting element is also formed with a longitudinally tapering lower end portion 89, shown in FIGURE 4, which is positioned for coaction with the ring 76 to cause a reduction in the flow of fluid through the mandrel upon upward movement of the mandrel when the cutter elements are in extended position, whereby the downward pressure exerted on the mandrel will be increased to hold the cutter elements extended in the event of any tendency for the mandrel to be moved upwardly by the spring during the cutting operation. This permits adjustment of effective orifice size to pump output.

As soon as the well casing has been cut through, the downward pressure of fluid on the mandrel will move the mandrel further downwardly to expand the cutters to the positions illustrated in FIGURE 3, whereupon the ring 76 will be moved downwardly beyond the external enlargement 88 to allow an increased downward flow of fluid through the mandrel.

In the operation of the tool, the tool is connected to the lower end of an operating string and lowered into the well casing in the condition illustrated in FIGURE 1, the cutter elements being in their retracted positions, with the mandrel in its upmost position in the barrel, in which position it is held by the spring 68. Due to the externally reduced diameter of the flow restricting element 86 above the external enlargement 88 thereof, fluid may be circulated through the tool during the positioning of the tool in the well, the ring 76 of the head 64 of the mandrel being located above the enlargement 88 to permit such free flow of the fluid.

The restricting element 86 is free to move upwardly, as seen in dotted lines in FIGURE 4, under the influence of the inflow of fluid into the barrel from below during the downward movement of the tool in the well, in the event that the annular clearance between the mandrel and the restricting element is insufficient to provide free flow. When the tool has reached the desired location in the casing, the downward flow of fluid through the tool may be established to exert a downward pressure on the head 64 of the mandrel to move the mandrel downwardly in the barrel to position the ring 76 opposite the enlargement 88, whereupon the downward flow of fluid will be restricted to further increase the pressure exerted on the mandrel in a direction to move the cutter elements into cutting engagement with the surrounding well casing. With the tool thus positioned at the desired location and the cutting elements in engagement with the well casing, the tool may be rotated to cut through the casing.

When the cutters have thus cut through the casing, the cutters will then move radially outwardly under the downward force of the circulating fluid exerted on the mandrel to move the cutters to their fully extended positions with the lower ends of the cutters in engagement with the upper end of the casing below, in position to mill away the casing upon further rotation of the tool. When the cutters, are thus fully extended, the ring 76 of the mandrel will be below the enlargements 88 thus indicating by pressure drop that the casing has been cut through and the cutters are in position to perform the milling operation.

It will be apparent that during the insertion of the tool in the well and during the cutting operation, the external blades 28 at the lower end of the tool will serve to center the tool in the casing and to ream away obstructions, such as inwardly deformed portions of the casing.

When the cutting and milling operation has been completed, the tool may be removed from the well by reducing the downward circulation of fluid through the tool to permit the mandrel to move upwardly to allow the cutter blades to be moved radially inwardly by contact with the casing upon upward movement of the tool therein. The cutter elements 40 may be dimensioned to provide clearance between the elements and the sides of the window openings 36 of the barrel, and it will be apparent that the cutter elements may be urged laterally toward the leading sides of the window openings to permit any burrs formed on the portions 60 along the trailing sides of the elements, during the cutting operation, to move into the full window openings with the elements upon retraction of the elements.

The internal diameter of the barrel of the tool is somewhat larger than the internal diameter of the operating string to which the tool is attached, so that the orifice in the tubular mandrel 62 may have substantial clearance about the shank section of the flow restricting element 84, whereby there will be no substantial restriction to the upward flow of fluid through the tool and in the operating string during the lowering of the tool in the well, and likewise, fluid may readily drain out of the string during the removal of the string from the well. By this construction, upward flow of fluid in the barrel may move the flow restricting element into the enlarged cavity in the top sub 14 to permit full flow of the fluid upwardly in the barrel.

When the tool has been operated to cut through the surrounding well casing, the cutter elements will move to their fully extended positions, with the projections 44 bearing on the external faces 80 of the lugs 78, which are of full width, so that the cutter elements will be firmly backed up during the milling operation.

With the cutter elements thus fully extended, it will be apparent that the mandrel will be free to reciprocate longitudinally somewhat as pump surge forces are resisted by the retracting spring 68 which serves to prevent any binding of the mandrel and insures the return of the parts to their initial positions when circulation is stopped.

If desired, cutter elements may be retracted and the tool may then be positioned at a new location preliminary to repeating the cutting operations when it is desired to cut the casing at a number of locations.

It will thus be seen that the invention constructed and operated as described above provides a cutting and milling tool of improved strength, in which substantial, unrestricted filling and draining of the operating string may take place during the insertion of the string into the well and its removal therefrom and in which the cutting through the casing will be indicated by a change in the pressure of fluid in the string.

The invention is disclosed herein in connection with a specific embodiment of the same, but it will be understood that this is intended by way of illustration only and that various changes can be made in the construction and arrangement of the parts within the spirit of the invention and the scope of the appended claims.

Having thus clearly shown and described the invention, what is claimed as new and desired to secure by Letters Patent is:

1. In a cutting tool for use in wells, a tubular barrel adapted to be connected to a tubular operating string for movement with the string in a well bore and having a longitudinally elongated opening in communication with the interior of the barrel and with the exterior thereof, a cutter element movably supported on the barrel for radial movement into and out of a position extending outwardly beyond the opening, a tubular mandrel movably disposed in the barrel for longitudinal movement therein, means forming a seal between the mandrel and barrel to close the barrel against the flow of fluid therethrough externally of the mandrel, wedge means on the mandrel and element positioned for coaction upon longitudinal movement of the mandrel in one direction to move the element radially outwardly relative to the barrel and upon longitudinal movement of the mandrel in the other direction to permit the element to move radially inwardly relative to the barrel, longitudinally contoured flow restricting means in the barrel positioned to be located centrally within the bore of the mandrel to provide sequentially variable restriction to the flow of fluid through the mandrel as said mandrel is moved longitudinally through the working stroke of the mandrel within said barrel, said restricting means being positioned to permit substantially unrestricted flow upon longitudinal movement of said mandrel beyond the length of said wedge means, and means positioned for coaction with the barrel and mandrel to yieldingly resist longitudinal movement of the mandrel in said one direction.

2. In a cutting tool for use in wells, a tubular barrel adapted to be connected to a tubular operating string for movement with the string in a well bore and having a longitudinally elongated opening in communication with the interior of the barrel and with the exterior thereof, a cutter element movably supported on the barrel for radial movement into and out of a position extending outwardly beyond the opening, a tubular mandrel movably disposed in the barrel for longitudinal movement therein, means forming a seal between the mandrel and barrel to close the barrel against the flow of fluid therethrough externally of the mandrel, means on the mandrel and element positioned for coaction upon longitudinal movement of the mandrel in one direction to move the element radially outwardly relative to the barrel and to hold the element in radially outwardly extending position upon further movement of the mandrel in said one direction, said element being movable radially inwardly relative to the barrel upon longitudinal movement of the mandrel in the other direction, longitudinally contoured flow restricting means movably disposed in the barrel positioned to be located centrally within the bore of the mandrel to provide sequentially variable restriction to the flow of fluid through the mandrel as said mandrel is moved longitudinally through the working stroke of the mandrel within said barrel, said restricting means being free to move upwardly from flow restrictive position in response to the upward flow of fluid in the barrel, and means positioned for coaction with the barrel and mandrel to yieldingly resist longitudinal movement of the mandrel in said one direction.

3. In a cutting tool for use in wells, a tubular barrel adapted to be connected to a tubular operating string for movement with the string in a well bore and having a longitudinally elongated opening in communication with the interior of the barrel and with the exterior thereof, a tubular mandrel movably disposed in the barrel for longitudinal movement therein, means forming a seal between the mandrel and the barrel to close the barrel against the flow of fluid therethrough exteriorly of the mandrel, a cutter element movably supported on the barrel for radial movement into and out of a position extending outwardly from said opening, means on the mandrel and element positioned for coaction to move the element into said position upon longitudinal movement of the mandrel in one direction and to allow the element to move out of said position upon longitudinal movement of the mandrel in the other direction, means positioned for coaction with the barrel and mandrel to yieldingly urge the mandrel in said other direction, flow restricting means in the barrel positioned to extend into said mandrel during movement of the mandrel in said one direction and shaped for coaction with the mandrel to restrict the flow of fluid through the mandrel when the mandrel is at the limit of its movement in said other direction to cause an increase in the force exerted on the mandrel by fluid flowing through the string in said one direction and a further increase in such force when the mandrel reaches a predetermined position in its movement in said one direction and to be located externally of the mandrel upon continued movement of the mandrel in said one direction beyond said predetermined position to permit unrestricted flow of fluid through the mandrel.

4. In a cutting tool for use in wells, a tubular barrel adapted to be connected to a tubular operating string for movement with the string in a well bore and having a longitudinally elongated opening in communication with the interior of the barrel and with the exterior thereof, a tubular mandrel movably disposed in the barrel for longitudinal movement therein, a cutter element movably supported on the barrel for radial movement into and out of a position extending outwardly from said opening, means on the mandrel and element positioned for coaction to move the element into said position upon longitudinal movement of the mandrel in one direction and to allow the element to move out of said position upon longitudinal movement of the mandrel in the other direction, means positioned for coaction with the barrel and mandrel to yieldingly urge the mandrel in said other direction, longitudinally contoured flow restricting means in the barrel positioned to extend into the mandrel and shaped for coaction with the mandrel when the mandrel reaches a predetermined position in its movement in said other direction to reduce the flow of fluid through the mandrel in said one direction and to be located externally of the mandrel when the mandrel reaches a predetermined position in its movement in said one direction to allow unrestricted flow of fluid through the mandrel in said one direction, said restricting means being also shaped for coaction when the mandrel reaches a position in which said element is fully extended to restrict the flow of fluid through the mandrel in said one direction to hold the element in its fully extended position.

5. In a cutting tool for use in wells, a tubular barrel adapted to be connected to a tubular operating string for movement with the string in a well bore and formed with circumferentially spaced, longitudinally elongated openings in communication with the bore and with the exterior of the barrel, cutter elements movably disposed in said openings for radial movement into and out of positions extending radially outwardly from the barrel, a tubular mandrel movably disposed in the barrel for longitudinal movement therein, means forming a seal between the mandrel and barrel to close the barrel against the flow of fluid therethrough externally of the mandrel, means on the mandrel and elements positioned for coaction upon downward movement of the mandrel from an upper position to move the elements to said extended positions, means in the barrel extending into the mandrel and shaped for coaction with the mandrel to restrict the downward flow of fluid through the mandrel to cause the mandrel to move downwardly from said upper position upon an increase in the pressure of the fluid in the string and to further restrict the downward flow of fluid through the mandrel when the mandrel reaches a predetermined position of its downward movement to increase the force exerted by the mandrel on the elements tending to move the elements radially outwardly and yieldable means positioned for coaction with the mandrel and barrel to yieldingly resist downward movement of the mandrel.

6. In a cutting tool for use in wells, a tubular barrel adapted to be connected to a tubular operating string for movement with the string in a well bore and formed with circumferentially spaced, longitudinally elongated openings in communication with the bore and with the exterior of the barrel, cutter elements movably disposed in said openings for radial movement into and out of positions extending radially outwardly from the barrel, a tubular mandrel movably disposed in the barrel for longitudinal movement therein, means forming a seal between the mandrel and barrel to close the barrel against the flow of fluid therethrough externally of the mandrel, wedge means on the mandrel and elements positioned for coaction upon downward movement of the mandrel from an upper position to move the elements to said extended positions and including means positioned for coaction to hold the elements extended during further downward movement of the mandrel with the elements in their fully extended positions, means in the barrel extending into the mandrel and shaped for coaction with the mandrel to restrict the downward flow of fluid through the mandrel to cause the mandrel to move downwardly from said upper position upon an increase in the pressure of fluid in the string and to further restrict the downward flow of fluid through the mandrel when the mandrel reaches a predetermined position of its downward movement to increase the force exerted by the mandrel on the elements tending to move the elements radially outwardly, said restricting means being positioned to relieve the restriction to the downflow of fluid through the mandrel when the elements reach their fully extended positions, and yieldable means positioned for coaction with the mandrel and barrel to yieldingly resist downward movement of the mandrel.

7. In a cutting tool for use in wells, a tubular barrel adapted to be connected to a tubular operating string for movement with the string in a well bore and formed with circumferentially spaced openings in communication with the exterior of the barrel, cutter elements movably disposed in said openings for radial movement from retracted positions radially within the outer surface of the barrel to positions extending radially outwardly therefrom, a tubular mandrel movably disposed in the barrel for longitudinal movement therein, means forming a seal between the barrel and mandrel to close the barrel against the flow of fluid therethrough externally of the mandrel, means on the mandrel and elements shaped for engagement radially inwardly of the openings upon downward movement of the mandrel from an upper position to move the element radially outwardly and for engagement to hold the elements extended during further downward movement of the mandrel when the elements are in their fully extended positions, means in the barrel positioned to restrict the downward flow of fluid through the mandrel when the mandrel is in said upper position to cause the mandrel to move downwardly upon an increase in the pressure of fluid in the string and shaped to further restrict the flow of fluid through the mandrel when the mandrel reaches a position below said upper position to increase the force exerted by the mandrel tending to move the element toward said extended positions, and yieldable means positioned for coaction with the barrel and mandrel to yieldingly resist downward movement of the mandrel.

References Cited by the Examiner
UNITED STATES PATENTS

| | | | |
|---|---|---|---|
| 2,218,766 | 10/1940 | Parker | 166—55.8 |
| 2,690,218 | 9/1954 | Robishaw | 166—55.8 |
| 2,709,490 | 5/1955 | Trimble et al. | 166—55.8 |
| 2,725,936 | 12/1955 | Hester | 166—55.8 |
| 2,735,485 | 2/1956 | Metcalf | 166—55.8 |
| 2,803,301 | 8/1957 | Warner | 166—55.7 |
| 2,859,943 | 11/1958 | Chadderdon | 166—55.8 |
| 2,940,522 | 6/1960 | Taylor et al. | 166—55.8 |
| 2,940,523 | 6/1960 | Brown et al. | 166—55.8 |
| 3,003,559 | 10/1961 | Leathers et al. | 166—55.8 |
| 3,126,065 | 3/1964 | Chadderdon | 175—269 |

CHARLES E. O'CONNELL, *Primary Examiner.*

BENJAMIN BENDETT, NORMAN YUDKOFF,
*Examiners.*